(12) United States Patent
Moran et al.

(10) Patent No.: US 8,156,273 B2
(45) Date of Patent: Apr. 10, 2012

(54) METHOD AND SYSTEM FOR CONTROLLING TRANSMISSION AND EXECUTION OF COMMANDS IN AN INTEGRATED CIRCUIT DEVICE

(75) Inventors: Christine E. Moran, Austin, TX (US);
Matthew D. Akers, Austin, TX (US);
Annette Pagan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 577 days.

(21) Appl. No.: 11/747,087

(22) Filed: May 10, 2007

(65) Prior Publication Data

US 2008/0282007 A1     Nov. 13, 2008

(51) Int. Cl.
*G06F 13/00* (2006.01)
*G06F 7/38* (2006.01)
*G06F 13/368* (2006.01)
*G06F 12/00* (2006.01)
*G06F 13/26* (2006.01)

(52) U.S. Cl. .......... 710/110; 326/38; 710/121; 710/122; 710/123; 710/240; 710/241; 710/242; 710/243; 710/264; 710/265

(58) Field of Classification Search .................. 710/110, 710/121–123, 240–243, 264–265; 326/38
See application file for complete search history.

(56) References Cited

U.S. PATENT DOCUMENTS

| | | | |
|---|---|---|---|
| 4,968,977 A | | 11/1990 | Chinnaswamy et al. |
| 5,230,044 A | | 7/1993 | Cao et al. |
| 5,265,257 A | * | 11/1993 | Simcoe et al. ................ 710/263 |
| 5,313,641 A | * | 5/1994 | Simcoe et al. ................ 710/242 |
| 5,572,734 A | * | 11/1996 | Narad et al. .................. 710/200 |
| 5,805,837 A | * | 9/1998 | Hoover et al. ................ 710/110 |
| 6,028,452 A | | 2/2000 | Benschneider |
| 6,034,542 A | * | 3/2000 | Ridgeway ....................... 326/39 |
| 6,098,109 A | | 8/2000 | Kotzur et al. |
| 6,157,978 A | | 12/2000 | Ng et al. |
| 6,205,524 B1 | | 3/2001 | Ng |
| 6,230,229 B1 | * | 5/2001 | Van Krevelen et al. ....... 710/317 |
| 6,526,052 B1 | * | 2/2003 | Rijhsinghani et al. ........ 370/389 |
| 6,535,941 B1 | | 3/2003 | Kruse |
| 6,654,343 B1 | | 11/2003 | Brandis et al. |
| 6,671,761 B2 | * | 12/2003 | Kim ............................... 710/244 |
| 6,704,846 B1 | | 3/2004 | Wu et al. |
| 9,725,307 C1 | | 4/2004 | Alvarez, II et al. |
| 6,763,415 B1 | | 7/2004 | Tischler |
| 6,895,459 B2 | | 5/2005 | Hadwiger et al. |

(Continued)

OTHER PUBLICATIONS

William W. Barns, Precedence and Priority Access Implementation for Department of Defense Data Networks, The MITRE Corporation, Jul. 1991.*

*Primary Examiner* — Paul R Myers
*Assistant Examiner* — Christopher a Daley
(74) *Attorney, Agent, or Firm* — Yudell Isidore Ng Russell PLLC

(57) ABSTRACT

A method and system for controlling transmission and execution of commands in an integrated circuit (IC) device provide transmission of commands and acknowledgements in an order of their priorities. Priority levels of the commands and acknowledgements are defined based on pre-assigned levels of precedence of the respective master and slave devices. In one application, the invention is used to increase performance of IC devices employing an Advanced eXtensible Interface (AXI).

17 Claims, 2 Drawing Sheets

U.S. PATENT DOCUMENTS

| | | | |
|---|---|---|---|
| 6,898,649 B2 | 5/2005 | Goudie | |
| 6,901,079 B1* | 5/2005 | Phadnis et al. | 370/466 |
| 6,925,520 B2 | 8/2005 | Ma et al. | |
| 6,976,109 B2* | 12/2005 | Shenderovich | 710/243 |
| 6,981,077 B2* | 12/2005 | Modelski et al. | 710/100 |
| 7,167,937 B2* | 1/2007 | Anjo et al. | 710/110 |
| 7,219,178 B2* | 5/2007 | Harris et al. | 710/110 |
| 7,263,566 B2* | 8/2007 | Ganasan et al. | 710/118 |
| 7,643,493 B1* | 1/2010 | Sayrafian-Pour | 370/395.4 |
| 2002/0023186 A1* | 2/2002 | Kim | 710/244 |
| 2002/0186676 A1* | 12/2002 | Milley et al. | 370/341 |
| 2003/0167364 A1* | 9/2003 | Anjo et al. | 710/110 |
| 2004/0267994 A1* | 12/2004 | Mathewson et al. | 710/110 |
| 2005/0021871 A1* | 1/2005 | Georgiou et al. | 709/250 |
| 2005/0235084 A1* | 10/2005 | Nariai | 710/110 |
| 2005/0273544 A1* | 12/2005 | Fitzsimmons et al. | 710/317 |
| 2006/0059530 A1* | 3/2006 | Spielman et al. | 725/132 |
| 2006/0179192 A1* | 8/2006 | Ganasan et al. | 710/110 |
| 2006/0271715 A1* | 11/2006 | Harris et al. | 710/110 |
| 2007/0126474 A1* | 6/2007 | Chang et al. | 326/38 |
| 2007/0236727 A1* | 10/2007 | Proust et al. | 358/1.15 |
| 2008/0208713 A1* | 8/2008 | Vadlamani | 705/27 |
| 2008/0232248 A1* | 9/2008 | Barave et al. | 370/230 |
| 2008/0244131 A1* | 10/2008 | Vergnes et al. | 710/110 |

* cited by examiner

METHOD AND SYSTEM FOR CONTROLLING TRANSMISSION AND EXECUTION OF COMMANDS IN AN INTEGRATED CIRCUIT DEVICE

BACKGROUND

1. Field

The present inventions relates generally to integrated circuits (IC) devices, and more specifically, to a method and system for controlling transmission and execution of commands in an IC device.

2. Related Art

An IC device may include a plurality of functional devices operating in a permanent or temporary master/slave relationship, where the direction of control is established from one group of the devices ("master devices") to the other group ("slave devices"). In the master/slave relationship, master devices generate commands to the respective slave devices, which communicate back to the master devices on the status of execution of these commands. Reports confirming execution of the commands by slave devices are referred to as "acknowledgements".

In operation, the master device generates a new command after receiving an acknowledgement that the preceding command (or commands) has been executed. In the IC device, individual master and slave devices may have different levels of precedence and the respective commands and acknowledgement have different levels of priority. In general, the levels of priority of commands and acknowledgements are defined by functions of the particular master or slave devices, applications running in the IC device, or program steps of these applications.

Real-time control over the traffic of commands and acknowledgements originated by multiple master and slave devices is a complex process, which effectiveness determines operational performance of the IC device. Despite the considerable effort in the art devoted to development of methods and systems for controlling transmission and execution of commands in IC devices, further improvements would be desirable.

BRIEF DESCRIPTION OF THE DRAWINGS

The present invention is illustrated by way of example and is not limited by the accompanying figures, in which like references indicate similar elements, except that suffixes may be added, when appropriate, to differentiate such elements. Elements in the figures are illustrated for simplicity and clarity and have not necessarily been drawn to scale.

It is contemplated that features or steps of one embodiment of the invention may beneficially be incorporated in other embodiments without further recitation.

DETAILED DESCRIPTION

Figure 1:
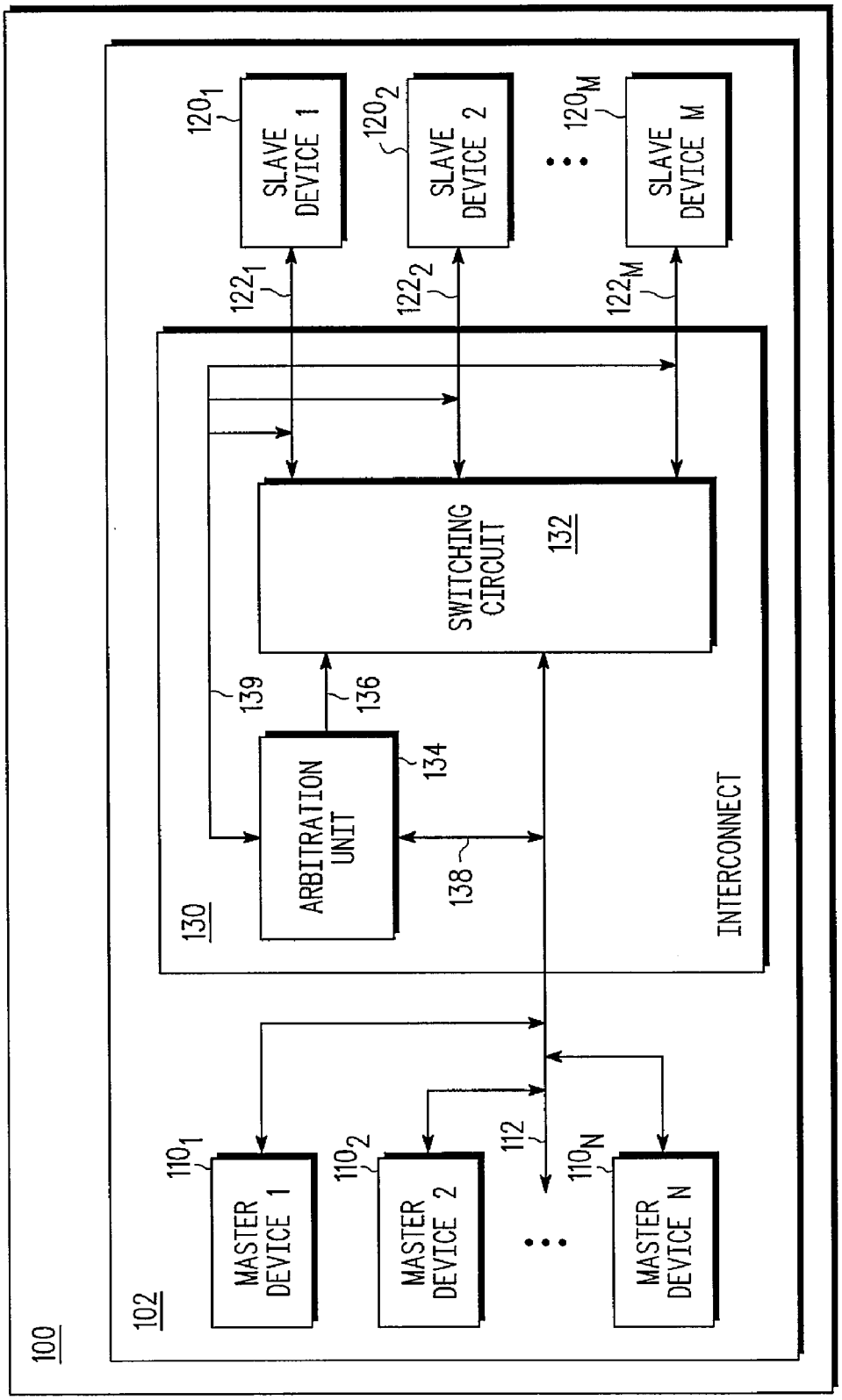
FIG. 1 is a schematic diagram illustrating a system for controlling transmission and execution of commands in an IC device in accordance with one embodiment of the present invention.

Referring to the figures, FIG. 1 depicts a schematic diagram illustrating a system 102 for controlling transmission and execution of commands in an IC device 100 in accordance with one embodiment of the present invention. The IC device 100 may be fabricated as a single integrated circuit (as shown) or, alternatively, as a system-on-chip (SoC) device comprising a plurality of integrated circuits.

The system 102 illustratively comprises N master devices 110, M slave devices 120, and an interconnecting module, or interconnect, 130, where N and M are integers and at least one of N or M is greater than 1. In the depicted embodiment, the master devices 110 are coupled to the interconnect 130 via a common bus 112 and each of the slave devices 120 is coupled to the interconnect 130 via a respective interface $122_I$-$122_M$.

In alternate embodiments (not shown), at least a portion of the master devices 110 may be coupled to the interconnect 130 via dedicated interfaces, or at least a portion of the slave devices 120 may be coupled to the interconnect 130 via a common bus. Additionally or alternatively, at least a portion of the master devices 110 or slave devices 120 may be disposed external to the IC device 100.

Generally, in the system 102, information exchanges may be performed using parallel interfaces, serial interfaces or a combination thereof, and component devices of the system 102 are coupled to and compliant with the respective interfaces. In one particular embodiment, the interconnect 130, common bus 112, and interfaces $122_I$-$122_M$ are compliant with specifications of at least one of an Advanced eXtensible Interface (AXI), an Advanced High-performance Bus (AHB), an Advanced System Bus (ASB), or an Advanced Peripheral Bus (APB) of the Advanced Microcontroller Bus Architecture (AMBA) developed by ARM Ltd. of Cambridge, United Kingdom.

Examples of the master devices generally include main processors of multi-processor systems, processing cores or digital signal processing (DSP) systems of processors, controllers, and the like. Correspondingly, examples of the slave devices include co-processors of multi-processor systems, memory devices or arithmetic logic units (ALUs) of processors, peripherals, and the like.

The interconnect 130 generally includes a switching circuit 132 and an arbitration unit 134. The switching circuit 132 is controlled, via an interface 136, by the arbitration unit 134 and functions as a bus switch adapted to selectively couple, one at a time, any master device 110 to any slave device 120 or any slave device 120 to any master device 110.

In operation, the arbitration unit 134 monitors incoming traffic to the interconnect 130 from the master devices 110 (traffic on interface 138) or from the slave devices 120 (traffic on interface 139) and determines, in real time, an order in which commands and acknowledgements are transmitted in the system 102, as discussed below in reference to FIG. 2. In one particular embodiment, the interfaces 138 and 139 are parallel interfaces adapted for coupling to the interconnect 130 and interfaces $122_I$-$122_M$, which are developed based on the respective AMBA specifications.

Figure 2:
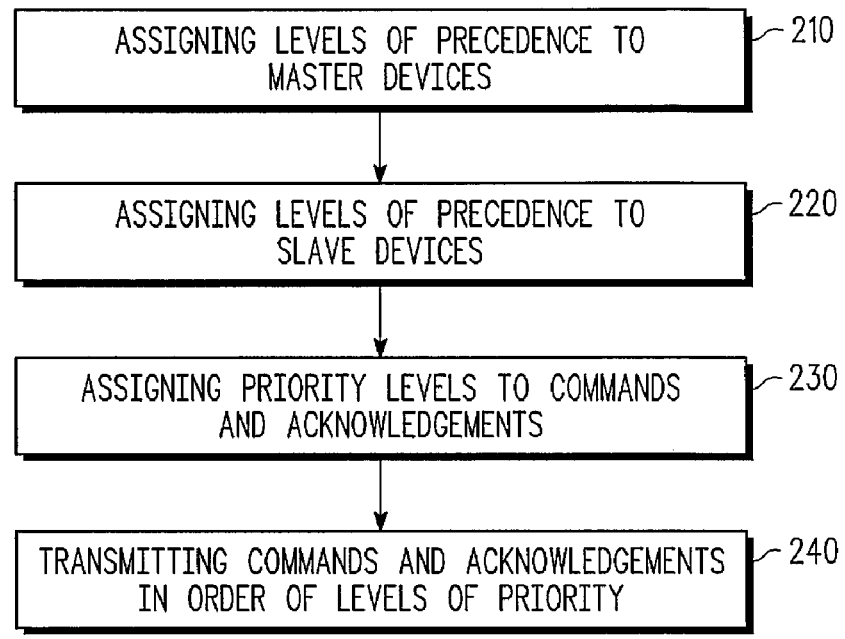
FIG. 2 is a flow diagram illustrating a method for controlling transmission and execution of commands in the system of FIG. 1 in accordance with one embodiment of the present invention.

FIG. 2 depicts a flow diagram illustrating a method 200 for controlling transmission and execution of commands in the IC device 100 in accordance with one embodiment of the present invention. In exemplary applications, the method 200 is used to enhance operational performance of IC devices. In various embodiments, method steps of the method 200 are performed in the depicted order or at least two of these steps (e.g., steps 210 and 220) or portions thereof may be performed in parallel, contemporaneously, or in a different order.

The method 200 starts at step 210, where N levels of precedence $LP_{MD}(i)$ are selectively assigned to N master devices 110 of the IC device 100, where i is an integer from 1 to N. The levels of precedence $LP_{MD}(i)$ may permanently be assigned to the respective master devices or assigned on an application-dependent basis, i.e., in different applications the same master devices may have different levels of precedence. In a further embodiment, during execution of particular application programs, such levels of precedence may dynamically be adjusted in real time.

In one embodiment, a master device assigned a level of precedence $LP_{MD}(i)$ having a smaller numerical value has, arbitrarily, a higher level of precedence. For example, the master devices 110 assigned the smallest and the biggest numerical values of $LP_{MD}(i)$ have, respectively, the highest and lowest levels of precedence among other master devices 110 of the IC device 100.

At step 220, M levels of precedence $LP_{SD}(j)$ are selectively assigned to M slave devices 120 of the IC device 100, where j is an integer from 1 to M. Similar to the $LP_{MD}(i)$, the levels of precedence $LP_{SD}(j)$ may be assigned to the respective slave permanently or on an application-dependent basis. Accordingly, in one embodiment, a slave device assigned a level of precedence $LP_{SD}(j)$ having a smaller numerical value has, arbitrarily, a higher level of precedence among other slave devices 120 of the IC device 100.

In the system 102, datagrams of commands and acknowledgements contain information identifying the levels of precedence $LP_{MD}(i)$ of the master devices 110 and the levels of precedence $LP_{SD}(j)$ of the slave devices 120 and, via the interfaces 138 and 139, such information is accessible by the arbitration unit 134 of the interconnect 130.

Figure 3:
FIG. 3 is a schematic diagram of a datagram of a command used in the system of FIG. 1.

Referring to FIG. 3, information identifying the levels of precedence $LP_{MD}(i)$ and $LP_{SD}(j)$ of the respective master and slave devices is included in a datagram 300 of a command generated by the master device 110. In one embodiment, the datagram 300 comprises a data field 310 containing identifiers (e.g., addresses or transaction IDs) of the master and slave devices, a data field 320 containing a numerical value of a level of precedence $LP_{MD}(i)$ of the master device, a data field 330 containing a numerical value of a level of precedence $LP_{SD}(j)$ of the slave device, a data field 340 containing a description/code of the command, and an optional data field 350 containing data directed to the slave device.

Figure 4:
FIG. 4 is a schematic diagram of a datagram of an acknowledgement used in the system of FIG. 1.

Referring to FIG. 4, information identifying the levels of precedence $LP_{MD}(i)$ and $LP_{SD}(j)$ of the respective master and slave devices is similarly included in a datagram 400 of an acknowledgement confirming execution of a command by a slave device 120. In one embodiment, the datagram 400 comprises a data field 410 containing identifiers (e.g., addresses or transaction IDs) of the master and slave devices, a data field 420 containing a numerical value of a level of precedence $LP_{MD}(i)$ of the master device, a data field 430 containing a numerical value of a level of precedence $LP_{SD}(j)$ of the slave device, a data field 440 containing a description/code of the acknowledgement, and an optional data field 450 containing data directed to the master device.

At step 230, using a pre-determined algorithm, levels of priority are assigned to commands generated by the master devices 110 and to acknowledgements originated by the respective slave devices 120. For determining the levels of priority of commands and acknowledgements, applications running on the IC device 100 may use the same or, alternatively, different algorithms.

In one embodiment, a level of priority $LP_C$ of a command is determined as a product of the level of precedence $LP_{MD}(i)$ of the master device 110 and the level of precedence $LP_{SD}(j)$ of the slave device 120, i.e., $LP_C=LP_{MD}(i) \times LP_{SD}(j)$, and an acknowledgement of execution of a command is assigned the same level of priority $LP_A$ as the respective command, i.e., $LP_A=LP_C$.

In the system 102, the levels of priority $LP_C$, $LP_A$ of the commands and acknowledgements are computed by the arbitration unit 134 based on the information contained in the data fields 320, 330 and 420, 430 of the datagrams 300 and 400, respectively.

Generally, the numerical values of the $LP_{MD}(i)$ and $LP_{SD}(j)$ are selected in a manner providing that no commands (or acknowledgements) can have the same numerical value of the level of priority $LP_C$ (or $LP_A$), otherwise a pre-determined routine is used by the arbitration unit 134 to regulate an order of transmissions of such commands (or acknowledgements). In one exemplary embodiment, a command or an acknowledgement having a smaller numerical value of the respective level of priority has, arbitrarily, a higher level of priority among other commands and acknowledgements transmitted, via the interconnect 130, between the respective master and slave devices 110, 120.

At step 240, the commands and acknowledgements are transmitted by the interconnect 130 in the order of their respective levels of priority. In operation, the order of transmitting the commands and acknowledgements through the interconnect 130 is dynamically adjusted to provide expeditious transmission of the ones having, to the moment, the highest levels of priority. In particular, a command or an acknowledgement having a higher level of priority is transmitted to the respective recipient prior to transmitting commands or acknowledgements having lower levels of priority.

Also the invention is described herein with reference to specific embodiments, various modifications and changes can be made without departing from the scope of the present invention. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

In various preferred embodiments, the methods and systems presented may be characterized as follows:

A method for controlling transmission and execution of commands in an integrated circuit (IC) device, the method including, selectively assigning levels of precedence to master devices, selectively assigning levels of precedence to slave devices, defining levels of priority of commands generated by the master devices based on the levels of precedence of the master devices and the levels of precedence of the slave devices, and transmitting commands and acknowledgements for execution of the commands in an order of their levels of priority.

The method further including, selecting each of the master devices from the group consisting of a main processor of multi-processor system, a processing core of a processor, a digital signal processing (DSP) systems of a processor, and a controller, and selecting each of the slave devices from the group consisting of a co-processor of a multi-processor system, a memory device, an arithmetic logic unit (ALU) of a processor, and a peripheral device.

The method further including identifying the levels of precedence of the master devices and the levels of precedence of the slave devices in datagrams of the commands and datagrams of the acknowledgements.

The method wherein at least a portion of the datagrams of the commands or acknowledgements includes data selectively directed to the slave devices or the master devices.

The method further including, assigning a level of priority of a command to an acknowledgement for execution of the command.

The method of further including selectively assigning to each master device a level of precedence $LP_{MD}(i)$, where i is an integer from 1 to N and N is a number of the master devices, selectively assigning to each slave device a level of precedence $LP_{SD}(j)$, where j is an integer from 1 to M and M is a number of the slave devices, and defining a level of priority $LP_C$ of a command and a level of priority $LP_A$ of an acknowledgement as follows: $LP_C = LP_A = LP_{MD}(i) \times LP_{SD}(j)$.

A computer readable medium storing program code that, when executed by a data processor, facilitates execution of the method.

A system for controlling transmission and execution of commands in an integrated circuit (IC) device, including master devices, slave devices, and an interconnecting module adapted to define levels of priority of the commands directed by the master devices to the slave devices using information contained in datagrams of the commands, define levels of priority of acknowledgements for execution of the commands using information contained in datagrams of the acknowledgements, and selectively transmit the commands and the acknowledgements in an order of their levels of priority.

The system, wherein the datagrams of the commands and the datagrams of the acknowledgements contain information identifying levels of precedence of the master devices and levels of precedence of the slave devices.

The system, wherein at least a portion of the datagrams of the commands or the datagrams of the acknowledgements includes data selectively directed to the slave devices or the master devices.

The system wherein the interconnecting module includes an arbitration unit adapted to establish an order of transmitting the commands and the acknowledgements based on their levels of priority, a switching circuit administered by the arbitration unit and adapted to selectively couple the master and slave devices.

The system further adapted to, define the levels of priority of the commands and the acknowledgements using a predetermined algorithm.

The system wherein the predetermined algorithm includes, selectively assigning to each master device a level of precedence $LP_{MD}(i)$, where i is an integer from 1 to N and N is a number of the master devices, selectively assigning to each slave device a level of precedence $LP_{SD}(j)$, where j is an integer from 1 to M and M is a number of the slave devices, defining a level of priority $LP_C$ of a command and a level of priority of an acknowledgement $LP_A$ as follows: $LP_C = LP_A = LP_{MD}(i) \times LP_{SD}(j)$.

The system wherein each of the master devices is selected from the group consisting of a main processor of multi-processor system, a processing core of a processor, and a digital signal processing (DSP) systems of a processor, and each of the slave devices is selected from the group consisting of a co-processor of a multi-processor system, a memory device, an arithmetic logic unit (ALU) of a processor, and a peripheral device.

The system wherein interconnecting module is compliant with specifications of at least one of an Advanced eXtensible Interface (AXI), an Advanced High-performance Bus (AHB), an Advanced System Bus (ASB), or an Advanced Peripheral Bus (APB) of the Advanced Microcontroller Bus Architecture (AMBA).

The system wherein the system is a portion of the IC device or a system-on-chip (SoC) device.

An apparatus for interconnecting master devices and slave devices of an integrated circuit (IC) device, including an arbitration unit adapted to define levels of priority of commands directed by the master devices to the slave devices using information contained in datagrams of the commands, define levels of priority of acknowledgements for execution of the commands using information contained in datagrams of the acknowledgements, and a switching circuit adapted to selectively couple the master and slave devices and transmit the commands and the acknowledgements in an order of their levels of priority.

The apparatus wherein, the datagrams of the commands and the datagrams of the acknowledgements include information identifying levels of precedence of the master and slave devices.

The apparatus wherein at least a portion of the datagrams of the commands or acknowledgements includes data selectively directed to the slave devices or the master devices.

A datagram for transmitting a command or an acknowledgement for execution of the command in an integrated circuit (IC) device, including a data field containing information identifying a level of precedence of a master device that originated the command; and a data field containing information identifying a level of precedence of a slave device that executed the command.

The datagram further including a data field containing data directed to the slave device or the master device.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling transmission and execution of commands in an integrated circuit (IC) device, the method comprising:
   selectively assigning levels of precedence to master devices;
   selectively assigning levels of precedence to slave devices;
   defining levels of priority of commands generated by the master devices based on the levels of precedence of the master devices and the levels of precedence of the slave devices; and
   transmitting commands and acknowledgements for execution of the commands in an order of their levels of priority, wherein information identifying the levels of precedence of the master devices and the levels of precedence of the slave devices are included in datagrams of the commands and datagrams of the acknowledgements.

2. The method of claim 1, further comprising:
   selecting each of the master devices from the group consisting of a main processor of multi-processor system, a processing core of a processor, a digital signal processing (DSP) systems of a processor, and a controller.

3. The method of claim 1, further comprising:
   selecting each of the slave devices from the group consisting of a co-processor of a multi-processor system, a memory device, an arithmetic logic unit (ALU) of a processor, and a peripheral device.

4. The method of claim 1, wherein at least a portion of the datagrams of the commands or acknowledgements includes data selectively directed to the slave devices or the master devices.

5. The method of claim 1, further comprising:
   assigning a level of priority of a command to an acknowledgement for execution of the command.

6. The method of claim 1, further comprising:
selectively assigning to each master device a level of precedence $LP_{MD}$;
selectively assigning to each slave device a level of precedence $LP_{SD}$; and
defining a level of priority $LP_C$ of a command and a level of priority $LP_A$ of an acknowledgement as follows: $LP_C=LP_A=LP_{MD}(i) \times LP_{SD}(j)$.

7. A system for controlling transmission and execution of commands in an integrated circuit (IC) device, comprising:
master devices;
slave devices; and
an interconnecting module adapted to:
identify levels of priority of the commands directed by the master devices to the slave devices based on the levels of precedence of the master devices and the levels of precedence of the slave devices using information included in datagrams of the commands;
identify levels of priority of acknowledgements for execution of the commands based on the levels of precedence of the master devices and the levels of precedence of the slave devices using information included in datagrams of the acknowledgements; and
selectively transmit the commands and the acknowledgements in an order of their levels of priority, wherein information identifying the levels of precedence of the master devices and the levels of precedence of the slave devices are included in datagrams of the commands and datagrams of the acknowledgements.

8. The system of claim 7, wherein at least a portion of the datagrams of the commands or the datagrams of the acknowledgements includes data selectively directed to the slave devices or the master devices.

9. The system of claim 7, wherein the interconnecting module comprises:
an arbitration unit adapted to establish an order of transmitting the commands and the acknowledgements based on their levels of priority; and
a switching circuit administered by the arbitration unit and adapted to selectively couple the master and slave devices.

10. The system of claim 7, wherein the interconnect module is adapted to:
define the levels of priority of the commands and the acknowledgements using a pre-determined algorithm.

11. The system of claim 10, wherein:
each master device is assigned a level of precedence $LP_{MD}$;
each slave device is assigned a level of precedence $LP_{SD}$; and
a level of priority $LP_C$ of a command and a level of priority of an acknowledgement $LP_A$ is defined as follows: $LP_C=LP_A=LP_{MD}(i) \times LP_{SD}(j)$.

12. The system of claim 7, wherein:
each of the master devices is selected from the group consisting of a main processor of multi-processor system, a processing core of a processor, and a digital signal processing (DSP) systems of a processor.

13. The system of claim 7, wherein:
each of the slave devices is selected from the group consisting of a co-processor of a multi-processor system, a memory device, an arithmetic logic unit (ALU) of a processor, and a peripheral device.

14. The system of claim 7, wherein interconnecting module is compliant with specifications of at least one of an Advanced eXtensible Interface (AXI), an Advanced High-performance Bus (AHB), an Advanced System Bus (ASB), or an Advanced Peripheral Bus (APB) of the Advanced Microcontroller Bus Architecture (AMBA).

15. The system of claim 7, wherein said system is a portion of the IC device or a system-on-chip (SoC) device.

16. An apparatus for interconnecting master devices and slave devices of an integrated circuit (IC) device, comprising:
an arbitration unit adapted to:
identify levels of priority of commands directed by the master devices to the slave devices based on the levels of precedence of the master devices and the levels of precedence of the slave devices using information included in datagrams of the commands; and
identify levels of priority of acknowledgements for execution of the commands based on the levels of precedence of the master devices and the levels of precedence of the slave devices using information included in datagrams of the acknowledgements; and
a switching circuit adapted to selectively couple the master and slave devices and transmit the commands and the acknowledgements in an order of their levels of priority, wherein the datagrams of the commands and the datagrams of the acknowledgements include information identifying levels of precedence of the master and slave devices.

17. The apparatus of claim 16, wherein at least a portion of the datagrams of the commands or acknowledgements includes data selectively directed to the slave devices or the master devices.

* * * * *